United States Patent
Agrawal

(10) Patent No.: US 7,254,158 B2
(45) Date of Patent: Aug. 7, 2007

(54) SOFT HANDOFF WITH INTERFERENCE CANCELLATION IN A WIRELESS FREQUENCY HOPPING COMMUNICATION SYSTEM

(75) Inventor: Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 10/622,663

(22) Filed: Jul. 17, 2003

(65) Prior Publication Data

US 2004/0229615 A1 Nov. 18, 2004

Related U.S. Application Data

(60) Provisional application No. 60/470,160, filed on May 12, 2003.

(51) Int. Cl.
H04B 1/713 (2006.01)
(52) U.S. Cl. .................... 375/136; 455/422.1
(58) Field of Classification Search ............ 375/132, 375/133, 135, 136, 260, 346, 347, 349, 340; 370/208, 210, 343, 344; 455/63.296, 422.1, 455/442, 501, 450, 451, 436
See application file for complete search history.

(56) References Cited

U.S. PATENT DOCUMENTS

| | | | | |
|---|---|---|---|---|
| 4,470,138 A | * | 9/1984 | Gutleber | 370/342 |
| 5,537,434 A | * | 7/1996 | Persson et al. | 375/134 |
| 5,548,582 A | * | 8/1996 | Brajal et al. | 370/206 |
| 6,504,837 B1 | * | 1/2003 | Menzel | 370/351 |
| 6,549,784 B1 | * | 4/2003 | Kostic et al. | 455/501 |
| 6,570,864 B1 | * | 5/2003 | Kim et al. | 370/342 |
| 6,570,909 B1 | * | 5/2003 | Kansakoski et al. | 375/148 |
| 6,826,409 B2 | * | 11/2004 | Kostic et al. | 455/501 |
| 2002/0196876 A1 | * | 12/2002 | Takada | 375/346 |

* cited by examiner

*Primary Examiner*—Betsy L. Deppe
(74) *Attorney, Agent, or Firm*—Kam T. Tam; Charles Brown; Thomas R. Rouse

(57) ABSTRACT

Techniques are provided to support soft handoff in a frequency hopping OFDMA system. Each sector concurrently supports "non-handoff" users and "soft-handoff" users. A non-handoff user communicates with only one sector, and a soft-handoff user communicates with multiple sectors simultaneously. Non-handoff users are assigned traffic channels by their sole sectors, and soft-handoff users are assigned traffic channels by their "serving" sectors. For each sector, the traffic channels assigned to the non-handoff users are orthogonal to one another and may or may not be orthogonal to the traffic channels assigned to the soft-handoff users. Each sector processes its received signal and recovers the data transmissions from the non-handoff users of that sector. Each sector then estimates the interference due to the non-handoff users and cancels the interference from the received signal. Each sector further processes its interference-canceled signal to recover the data transmissions from the soft-handoff users.

23 Claims, 8 Drawing Sheets

SOFT HANDOFF WITH INTERFERENCE CANCELLATION IN A WIRELESS FREQUENCY HOPPING COMMUNICATION SYSTEM

CROSS-REFERENCE TO RELATED APPLICATIONS

This application is related to the following, all of which are assigned to the same assignee of this application.

Co-pending U.S. application Ser. No. 60/470,160 filed May 12, 2003 and entitled "Soft Handoff with Interference Cancellation in a Wireless Frequency Hopping Comniunication System."

BACKGROUND

I. Field

The present invention relates generally to communication, and more specifically to techniques for supporting soft handoff in a wireless frequency hopping communication system using interference cancellation.

II. Background

In a frequency hopping communication system, data is transmitted on different frequency subbands in different time intervals, which may be referred to as "hop periods". These frequency subbands may be provided by orthogonal frequency division multiplexing (OFDM), other multi-carrier modulation techniques, or some other constructs. With frequency hopping, the data transmission hops from subband to subband in a pseudo-random manner. This hopping provides frequency diversity and allows the data transmission to better withstand deleterious path effects such as narrowband interference, jamming, fading, and so on.

An orthogonal frequency division multiple access (OFDMA) system utilizes OFDM and can support multiple users simultaneously. For a frequency hopping OFDMA system, a data transmission for a given user may be sent on a "traffic" channel that is associated with a specific frequency hopping (FH) sequence. This FH sequence indicates the specific subband to use for the data transmission in each hop period. Multiple data transmissions for multiple users may be sent simultaneously on multiple subband in a neighboring cell. To randomize inter-cell interference, the FH sequences for each cell are typically defined to be pseudo-random with respect to the FH sequences for neighboring cells. By using pseudo-random FH sequences for different cells, interference diversity is achieved and a data transmission for a user in one cell observes the average interference from the data transmissions for other users in other cells.

In a multi-cell OFDMA system, it is desirable to support "soft handoff", which is also referred to as "soft handover". Soft handoff is a process whereby a user communicates with multiple base stations simultaneously. Soft handoff can provide spatial diversity against deleterious path effects via transmission of data to or from multiple base stations at different locations. However, soft handoff is complicated when the system employs frequency hopping. This is because the FH sequences for one cell are pseudo-random (i.e., not orthogonal) with respect to the FH sequences for neighboring cells in order to randomize inter-cell interference. A user in soft handoff with multiple base stations may be instructed to use an FH sequence by a designated base station among the multiple base stations. The data transmission sent by the soft-handoff user will be orthogonal to the data transmissions sent by other users of the designated base station, but will be pseudo-random with respect to the data transmissions sent by users of other base stations. The soft-handoff user would cause interference to the users of the other base stations and would also receive interference from these users. The interference degrades the performance of all affected users, unless it is mitigated in some manner.

There is therefore a need in the art for techniques to support soft handoff in a frequency hopping OFDMA system.

SUMMARY

Techniques are provided herein to support soft handoff in a wireless communication system (e.g., a frequency hopping OFDMA system). Each cell in the system may be partitioned into one or multiple sectors. Each sector in the system may concurrently support a set of "non-handoff" users and a set of "soft-handoff" users. A non-handoff user is one who is communicating with only one sector (i.e., not in soft handoff). A soft-handoff user is one who is communicating with multiple sectors simultaneously.

For each sector, each non-handoff user of that sector is assigned a traffic channel by that sector and each soft-handoff user of that sector is assigned a traffic channel by a "serving" or "anchor" sector for the soft-handoff user. The serving sector for a soft-handoff user is a designated sector among the multiple sectors with which the soft-handoff user is in communication. For each sector, the traffic channels assigned to the non-handoff users of that sector are orthogonal to one another and may or may not be orthogonal to the traffic channels assigned to the soft-handoff users of that sector, depending on whether or not that sector is the serving sector for the soft-handoff users.

For each sector, the non-handoff users of that sector may be power-controlled such that their data transmissions can be received and decoded by that sector in the presence of interference from the soft-handoff users of that sector as well as the interference from users in other sectors. The soft-handoff users may also be power-controlled such that their data transmissions can be decoded by their sectors while minimizing interference to the non-handoff users.

Each sector processes its received signal and recovers the data transmissions from the non-handoff users of that sector. Once the data transmissions from the non-handoff users have been decoded, each sector estimates the interference due to the non-handoff users of that sector and cancels the interference from the received signal. Each sector further processes its interference-canceled signal to recover the data transmissions from the soft-handoff users of that sector.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
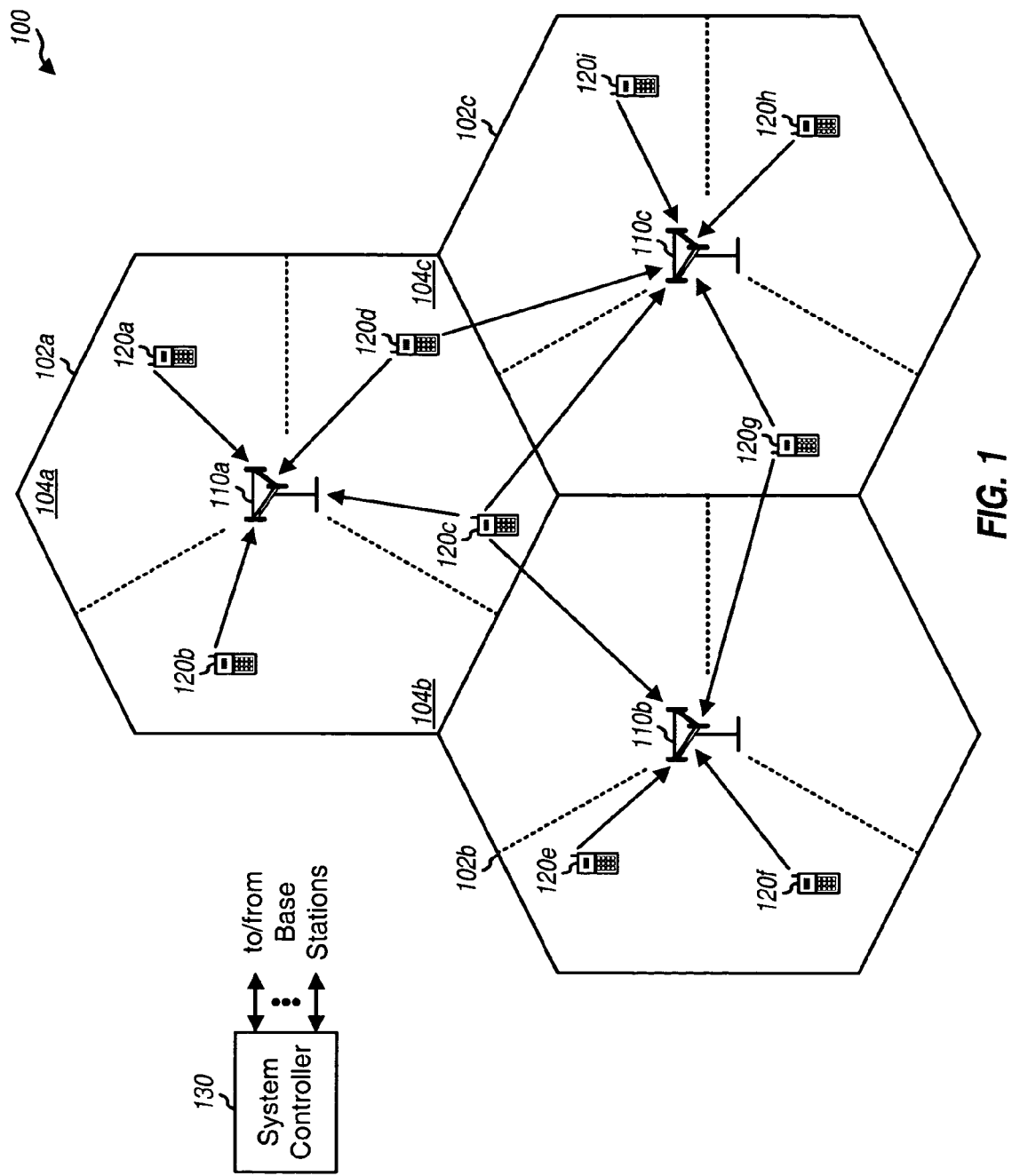
FIG. 1 shows an OFDMA system.

FIG. 1 shows an exemplary OFDMA system 100 that supports a number of users. System 100 includes a number of base stations 110 that provide communication for a number of terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology.

Each terminal may communicate with one or multiple base stations on the forward link and/or one or multiple base stations on the reverse link at any given moment. This depends on whether or not the terminal is active, whether or not soft handoff is supported, and whether or not the terminal is in soft handoff. The forward link (i.e., downlink) refers to the communication link from the base station to the terminal, and the reverse link (i.e., uplink) refers to the communication link from the terminal to the base station. In FIG. 1, terminal 120c is in soft handoff on the reverse link with base stations 110a, 110b, and 110c, terminal 120d is in soft handoff with base stations 110a and 110c, and terminal 120g is in soft handoff with base stations 110b and 110c. The remaining terminals are not in soft handoff. For simplicity, forward link transmissions are not shown in FIG. 1.

A system controller 130 couples to base stations 110 and may perform a number of functions such as (1) coordination and control for base stations 110, (2) routing of data among these base stations, and (3) access and control of the terminals served by these base stations.

Each base station (e.g. 110a, 110b, and 110c) provides coverage for a respective geographic area (e.g. 102a, 102b, and 102c). The term "cell" can refer to a base station and/or its coverage area, depending on the context in which the term is used. To increase capacity, the coverage area of each base station may be partitioned into multiple sectors (e.g., three sectors 104a, 104b, and 104c). Each sector may be served by a corresponding base transceiver subsystem (BTS). The term "sector" can refer to a BTS and/or its coverage area, depending on the context in which the term is used. For a sectorized cell, the base station for that cell typically includes the BTSs for all of the sectors of that cell. The following description assumes that each cell is partitioned into multiple sectors. For simplicity, in the following description, the term "base station" is used generically for both a fixed station that serves a cell and a fixed station that serves a sector. The base stations for all sectors of the same cell are typically implemented within one physical base station for that cell.

The techniques described herein may be used to support soft handoff, whereby a terminal concurrently communicates with multiple cells. The base stations for these cells are included in the terminal's active set. These techniques may also be used to support "softer handoff", which is a process whereby a terminal concurrently communicates with multiple sectors of the same cell. The base stations for these sectors (which are typically parts of the same physical base station) are included in the terminal's active set. For simplicity, in the following description, the term "soft handoff" generically refers to the case in which a terminal concurrently communicates with multiple cells as well as the case in which a terminal concurrently communicates with multiple sectors of the same cell.

The techniques described herein may be used for a synchronous system in which the timings of the base stations in the system are synchronized to a common clock source (e.g., GPS). These techniques may also be used for an asynchronous system in which the timings of the base stations in the system are not synchronized. For clarity, various details are described below for a synchronous system. Moreover, the primary users for each sector (defined below) are assumed to be synchronized with the base station for the sector.

OFDMA system 100 utilizes OFDM, which is a modulation technique that effectively partitions the overall system bandwidth into a number of (N) orthogonal frequency subbands, where N>1 and is typically a power of two. These subbands are also commonly referred to as tones, sub-carriers, bins, and frequency subchannels. With OFDM, each subband is associated with a respective sub-carrier that may be modulated with data. In some OFDM systems, only $N_D$ subbands are used for data transmission, $N_P$ subbands are used for pilot transmission, and $N_G$ subbands are not used and serve as guard subbands to allow the systems to meet spectral mask requirements, where $N=N_D+N_P+N_G$. For simplicity, the following description assumes that all N subbands can be used for data transmission.

Figure 2:
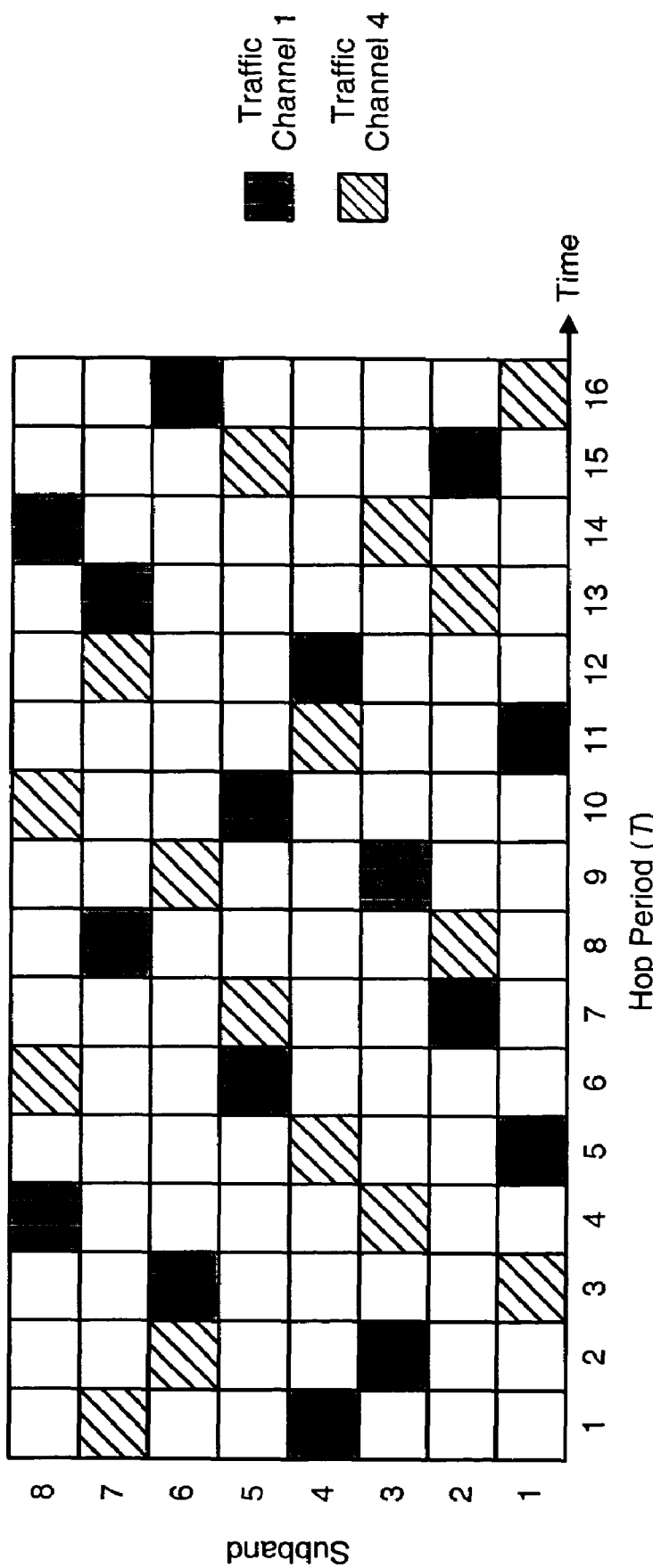
FIG. 2 illustrates frequency hopping for one sector in the OFDMA system.

FIG. 2 illustrates frequency hopping for one sector in the OFDMA system. Frequency hopping may be used to obtain various benefits including frequency diversity against deleterious path effects and interference randomization, as described above. For this example, N=8, and the eight subbands are assigned indices of 1 through 8. Up to eight traffic channels may be defined whereby each traffic channel uses one of the eight subbands in each hop period. A hop period may be defined to be equal to the duration of one or multiple OFDM symbols.

Each traffic channel is associated with a different FH sequence. The FH sequences for all traffic channels in the sector may be generated based on an FH function $f_s(k,T)$, where k denotes the traffic channel number or identifier (ID) and T denotes system time, which is given in units of hop periods. N different FH sequences may be generated with N different values of k in the FH function $f_s(k,T)$. The FH sequence for each traffic channel indicates the specific subband to use for that traffic channel in each hop period.

FIG. 2 shows the subbands used for two traffic channels 1 and 4. The FH sequence and subbands for traffic channel 1 are represented by the shaded boxes. The FH sequence and subbands for traffic channel 4 are represented by the diagonal-hashed boxes. It can be seen in FIG. 2 that each traffic channel dynamically hops from subband to subband in a pseudo-random manner determined by its FH sequence. In this example, the FH sequence for traffic channel 4, $f_s(4,T)$, is a vertically shifted version of the FH sequence for channel 1, $f_s(1,T)$. The subbands used for traffic channel 4 are related to the subbands used for traffic channel 1 as follows:

$$f_s(4,T)=(f_s(1,T)+3) \bmod N.$$

To avoid intra-sector interference, each sector may use orthogonal FH sequences for its traffic channels. The FH sequences are orthogonal to one another if no two FH sequences use the same subband in any hop period T. This orthogonality condition may be attained by defining the FH sequences for each sector to be vertically shifted versions of one another, as shown in FIG. 2. The traffic channels for each sector would then be orthogonal to one another because they are associated with orthogonal FH sequences. By allowing only one traffic channel to use each subband in each hop period, interference is avoided among multiple data transmissions sent on multiple traffic channels in the same sector.

For a multi-sector OFDMA system, data transmissions for users in one sector interfere with data transmissions for users in other sectors. To randomize inter-sector interference, pseudo-random FH functions may be used for different sectors. For example, the FH function $f_{s_1}(k,T)$ for sector $s_1$, may be defined to be pseudo-random with respect to the FH function $f_{s_2}(m,T)$ for sector $s_2$. In this case, the FH sequence used by sector $s_1$, for traffic channel k will be pseudo-random with respect to the FH sequence used by sector $s_2$ for traffic channel m, where k may or may not be equal to m. Interference between traffic channels k and m occurs whenever a "collision" occurs between the FH sequences for these traffic channels, i.e., whenever $f_{s_1}(k,T)=f_{s_2}(m,T)$ and traffic channels k and m both use the same subband in the same hop period. However, the interference will be randomized due to the pseudo-random nature of the FH functions $f_{s_1}(k,T)$ and $f_{s_2}(m,T)$.

The FH sequences for each sector may thus be defined to be:

1. Orthogonal to each other to avoid intra-sector interference, and
2. Pseudo-random with respect to the FH sequences for neighboring sectors to randomize inter-sector interference.

With the above constraints, a user assigned with traffic channel k by one sector will be orthogonal to all other users assigned with other traffic channels by the same sector. However, this user will not be orthogonal to all users in a neighboring sector, which uses a different FH function.

Referring back to FIG. 1, each sector concurrently supports a set of non-handoff users and a set of soft-handoff users. Each user may communicate with one or multiple sectors, depending on whether or not the user is in soft handoff. The sector or sectors with which a user currently communicates are included in an "active set". For a non-handoff user, the active set includes a single sector, which is the serving sector for that user. For a soft-handoff user, the active set includes multiple sectors, and one of these sectors (e.g., the strongest received sector) is designated as the serving sector for the soft-handoff user.

The non-handoff users of each sector are assigned traffic channels with orthogonal FH sequences by that sector and thus do not interfere with each other. Each soft-handoff user is assigned a traffic channel by its serving sector. Each soft-handoff user is orthogonal to, and does not interfere with, other users in its serving sector. However, each soft-handoff user will not be orthogonal to other users in other sectors in its active set. Thus, the soft-handoff users of each sector may or may not interfere with the non-handoff users of that sector. This depends on whether the soft-handoff users have been assigned traffic channels by that sector or by some other sectors.

For each sector, the non-handoff users of that sector may be power-controlled such that their data transmissions can be decoded by that sector in the presence of interference from the soft-handoff users of that sector as well as interference from the users in other sectors. The soft-handoff users may also be power-controlled such that their data transmissions can be decoded by the sectors in their active sets while minimizing interference to the non-handoff users.

In one embodiment, each sector processes its received signal and recovers the data transmissions from the non-handoff users of that sector. Each sector then estimates the interference due to the non-handoff users and cancels the interference from the received signal. Each sector further processes its interference-canceled signal to recover the data transmissions from the soft-handoff users of that sector.

Each sector may also be viewed as concurrently supporting a set of "primary" users and a set of "secondary" users. For each sector, a primary user is one who has been assigned a traffic channel by that sector, and a secondary user is one who has been assigned a traffic channel by another sector. The primary users of each sector include (1) non-handoff users of that sector and (2) soft-handoff users whose serving sector is that sector. The secondary users of each sector include soft-handoff users whose serving sectors are some other sectors besides that sector.

In another embodiment, each sector processes its received signal and recovers the data transmissions from the primary users of that sector (which include non-handoff users of that sector as well as soft-handoff users assigned traffic channels by that sector). Each sector then estimates the interference due to the primary users and cancels the interference from the received signal. Each sector further processes its interference-canceled signal to recover the data transmissions from the secondary users of that sector (which are assigned traffic channels by other sectors).

Each sector may recover the data transmissions from the users in other manners than the two embodiments described above, and this is within the scope of the invention. In general, it is desirable to cancel as much interference as possible. However, the ability to cancel the interference due to a given user is dependent on the ability to correctly decode the data transmission from that user, which may in turn be dependent on other factors such as, for example, the manner in which the user is power controlled.

Figure 3:
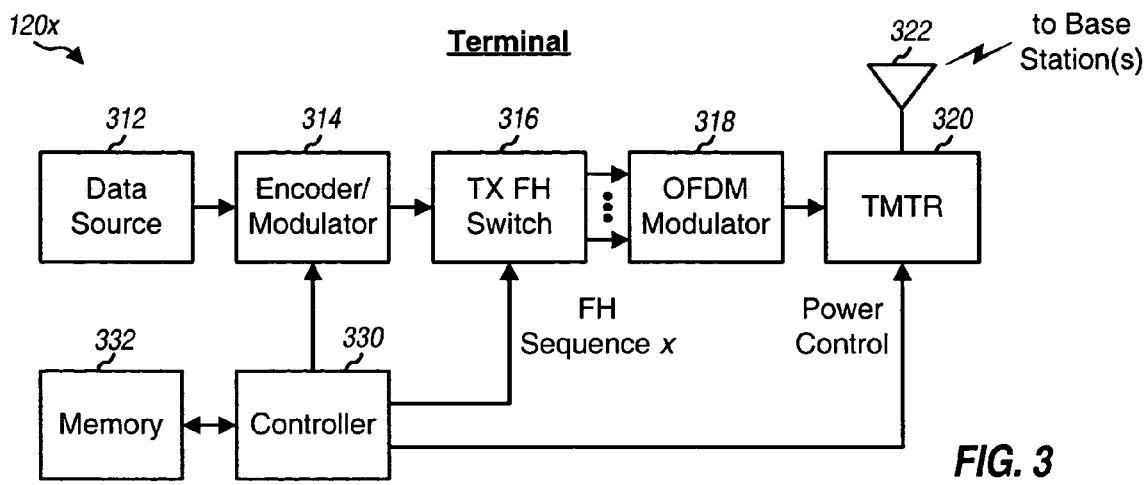
FIG. 3 shows a block diagram of a terminal.

FIG. 3 shows a block diagram of an embodiment of a terminal 120x, which is one of the terminals in OFDMA system 100. Terminal 120x may be for a non-handoff user or a soft-handoff user. For simplicity, only the transmitter portion of terminal 120x is shown in FIG. 3.

Within terminal 120x, an encoder/modulator 314 receives traffic data from a data source 312 and control data and other data from a controller 330. The traffic data is designated for transmission on traffic channel x, which is assigned to terminal 120x by the serving sector for the terminal. Encoder/modulator 314 formats, encodes, interleaves, and modulates the received data and provides modulation symbols (or simply, "data symbols"). Each modulation symbol is a complex value for a specific point in a signal constellation corresponding to the modulation scheme used for that modulation symbol.

A transmit frequency hopping (TX FH) switch 316 receives the data symbols and provides these symbols onto the proper subbands for traffic channel x. Traffic channel x is associated with FH sequence x, which indicates the specific subband to use for traffic channel x in each hop period T. FH sequence x may be generated by controller 330 based on the FH function $f_x(k,T)$ for the serving sector. TX FH switch 316 may also provide pilot symbols on pilot subbands and further provides a signal value of zero for each subband not used for pilot or data transmission. For each OFDM symbol period, TX FH switch 316 provides N "transmit" symbols (which are comprised of data symbols, pilot symbols, and zero-signal values) for the N subbands.

An OFDM modulator 318 receives the N transmit symbols for each OFDM symbol period and provides a corresponding OFDM symbol. OFDM modulator 318 typically includes an inverse fast Fourier transform (IFFT) unit and a cyclic prefix generator. For each OFDM symbol period, the IFFT unit transforms the N transmit symbols to the time domain using an N-point inverse FFT to obtain a "transformed" symbol that contains N time-domain "chips". Each chip is a complex value to be transmitted in one chip period. The cyclic prefix generator then repeats a portion of each transformed symbol to form an OFDM symbol that contains $N+C_p$ chips, where $C_p$ is the number of chips being repeated. The repeated portion is often referred to as a cyclic prefix and is used to combat inter-symbol interference (ISI) caused by frequency selective fading. An OFDM symbol period corresponds to the duration of one OFDM symbol, which is $N+C_p$ chip periods. OFDM modulator 318 provides a stream of OFDM symbols.

A transmitter unit (TMTR) 320 receives and processes the OFDM symbol stream to obtain a modulated signal. Transmitter unit 320 may further adjust the amplitude of the OFDM symbols and/or the modulated signal based on a power control signal received from controller 330. The modulated signal is transmitted from an antenna 322 to the base station(s) in the active set for terminal 120x.

Figure 4A:
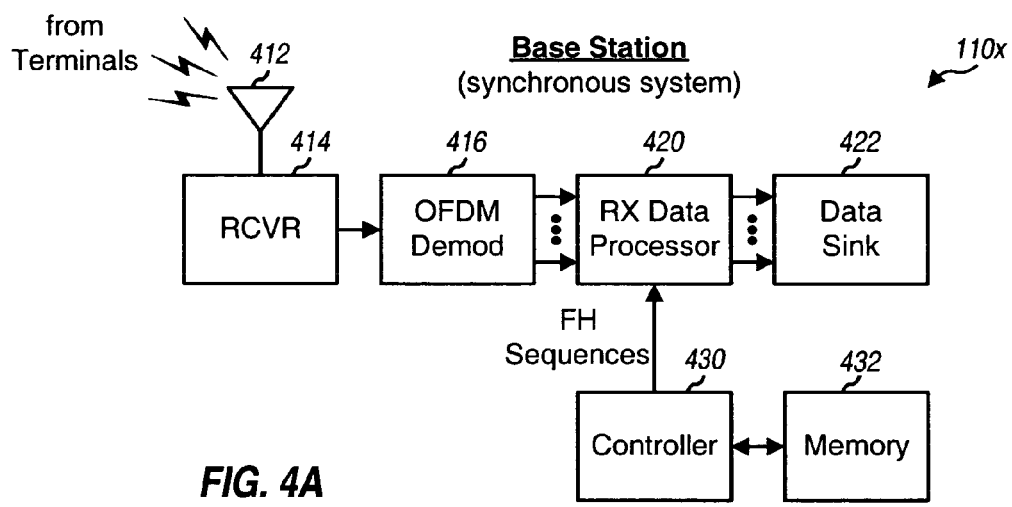
FIG. 4A shows a block diagram of a base station in a synchronous system.

FIG. 4A shows a block diagram of an embodiment of a base station 110x in a synchronous OFDMA system. Base station 110x is the fixed station for sector $s_x$. For simplicity, only the receiver portion of base station 110x is shown in FIG. 4.

The modulated signals transmitted by the terminals within the coverage of base station 110x are received by an antenna 412. The received signal from antenna 412 may include (1) one or more modulated signals from non-handoff users of sector $s_x$ and (2) one or more modulated signals from soft-handoff users of sector $s_x$. The received signal is provided to and processed by a receiver unit (RCVR) 414 to obtain samples. An OFDM demodulator 416 then processes the samples and provides "received" symbols, which are noisy estimates of the combined transmit symbols sent by all terminals received by base station 110x. OFDM demodulator 416 typically includes a cyclic prefix removal unit and an FFT unit. For each OFDM symbol period, the cyclic prefix removal unit removes the cyclic prefix in each received OFDM symbol to obtain a received transformed symbol. The FFT unit then transforms each received transformed symbol to the frequency domain with an N-point FFT to obtain N received symbols for the N subbands.

An RX data processor 420 obtains the N received symbols for each OFDM symbol period and processes these symbols to obtain decoded data for each terminal transmitting to base station 110x. The processing by RX data processor 420 is described in detail below. The decoded data for each terminal may be provided to a data sink 422 for storage.

Controllers 330 and 430 direct the operation at terminal 120x and base station 110x, respectively. Memory units 332 and 432 provide storage for program codes and data used by controllers 330 and 430, respectively.

Figure 4B:
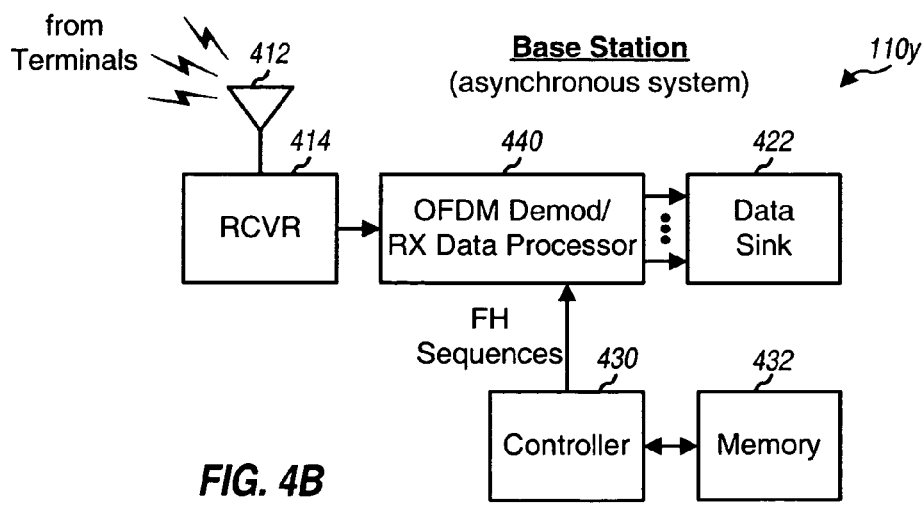
FIG. 4B shows a block diagram of a base station in an asynchronous system.

FIG. 4B shows a block diagram of an embodiment of a base station 110y in an asynchronous OFDMA system. For an asynchronous system, the timing of the secondary users may be different from that of the primary users. An OFDM demodulator/RX data processor 440 performs OFDM demodulation for each user based on that user's timing. OFDM demodulator/RX data processor 440 also performs interference cancellation on time-domain symbols, as described below.

The following description is for the embodiment whereby a primary user of sector $s_x$ is one assigned a traffic channel by sector $s_x$, and a secondary user of sector $s_x$ is one assigned a traffic channel by another sector besides sector $s_x$. A primary user of sector $s_x$ may be a non-handoff user of sector $s_x$ or a soft-handoff user of sector $s_x$ whose serving sector is sector $s_x$. A secondary user of sector $s_x$ is a soft-handoff user of sector $s_x$ whose serving sector is another sector besides sector $s_x$.

Figure 5:
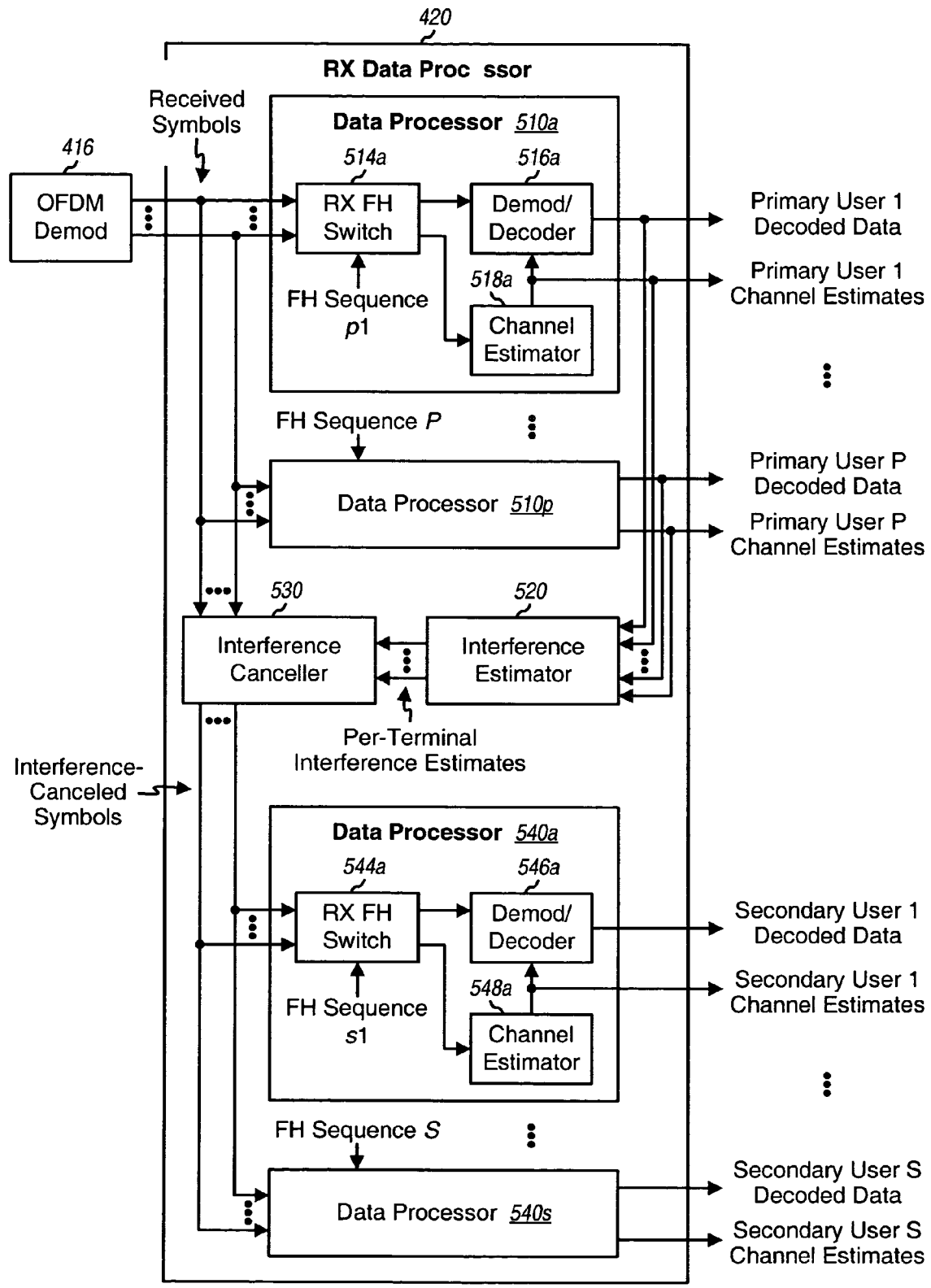
FIG. 5 shows a block diagram of a receive (RX) data processor within the base station in the synchronous system.

FIG. 5 shows a block diagram of an embodiment of RX data processor 420 within base station 110x in FIG. 4A for a synchronous OFDMA system. In this embodiment, RX data processor 420 includes P data processors 510a through 510p for P primary users, an interference estimator 520, an interference canceller 530, and S data processors 540a through 540s for S secondary users, where $P \geq 1$ and $S \geq 1$.

For each OFDM symbol period, OFDM demodulator 416 provides N received symbols for the N subbands to data processors 510a through 510p and interference canceller 530. One data processor 510 is assigned to recover the data transmission from each primary user. The processing by data processor 510a for a data transmission from primary user 1 is described below. Primary user 1 is assigned traffic channel p1, which is associated with FH sequence p1.

Within data processor 510a, an RX FH switch 514a receives the N received symbols for the N subbands in each OFDM symbol period. RX FH switch 514a provides received data symbols for traffic channel p1 to a demodulator (Demod)/decoder 516a and received pilot symbols for primary user 1 to a channel estimator 518a. Since traffic channel p1 dynamically hops from subband to subband, RX FH switch 514a operates in unison with TX FH switch 316 at the terminal for primary user p1 to extract the received data symbols from the proper subbands for traffic channel p1. The FH sequence provided to RX FH switch 514a is the same FH sequence provided to TX FH switch 316 at the terminal for primary user 1. Moreover, the FH sequences are synchronized.

A channel estimator 518a obtains received pilot symbols for primary user 1 from RX FH switch 514a (as shown in FIG. 5) or from the received symbols. Channel estimator 518a then derives channel estimates for primary user 1 based on the received pilot symbols. The channel estimates may include estimates for (1) the channel gain between the terminal for primary user 1 and base station 110x for each subband used for data transmission, (2) the signal strength of the pilot received from primary user 1, and (3) possibly other measurements.

Demodulator/decoder 516a may coherently demodulate the received data symbols from RX FH switch 514a with the channel estimates from channel estimator 518a to obtain data symbol estimates for primary user 1. Demodulator/decoder 516a further demodulates (i.e., symbol demaps), deinterleaves, and decodes the data symbol estimates to obtain decoded traffic data for primary user 1. In general, the processing performed by the units within base station 110x for primary user 1 is complementary to the processing performed by the corresponding units in the terminal for this primary user.

Data processors 510a through 510p provide decoded traffic data and channel estimates for primary users 1 through P, respectively. Interference estimator 520 receives the decoded traffic data and the channel estimates for primary users 1 through P, estimates the interference due to each of the P primary users, and provides interference estimates for the P primary users to interference canceller 530. Interference canceller 530 receives the N received symbols for the N subbands in each OFDM symbol period and the interference estimates for the P primary users. For each OFDM symbol period, interference canceller 530 determines the total interference due to the P primary users on each of the N subbands, subtracts the total interference from the received symbol for each subband, and provides N interference-canceled symbols for the N subbands. An exemplary design for interference estimator 520 and interference canceller 530 is described below.

One data processor 540 is assigned to recover the data transmission from each secondary user. Each data processor 540 includes an RX FH switch 544, a demodulator/decoder 546, and a channel estimator 548, which operate in similar manner as RX FH switch 514, demodulator/decoder 516, and channel estimator 518, respectively, within data processor 510. However, RX FH switch 544 within each data processor 540 is provided with the N interference-canceled symbols instead of the N received symbols for the N subbands. Moreover, RX FH switch 544 within each data processor 540 operates in unison with the TX FH switch at the terminal for the secondary user being recovered by that data processor. Data processors 540a through 540s provide decoded traffic data (and possibly channel estimates) for secondary users 1 through S, respectively.

Figure 6:
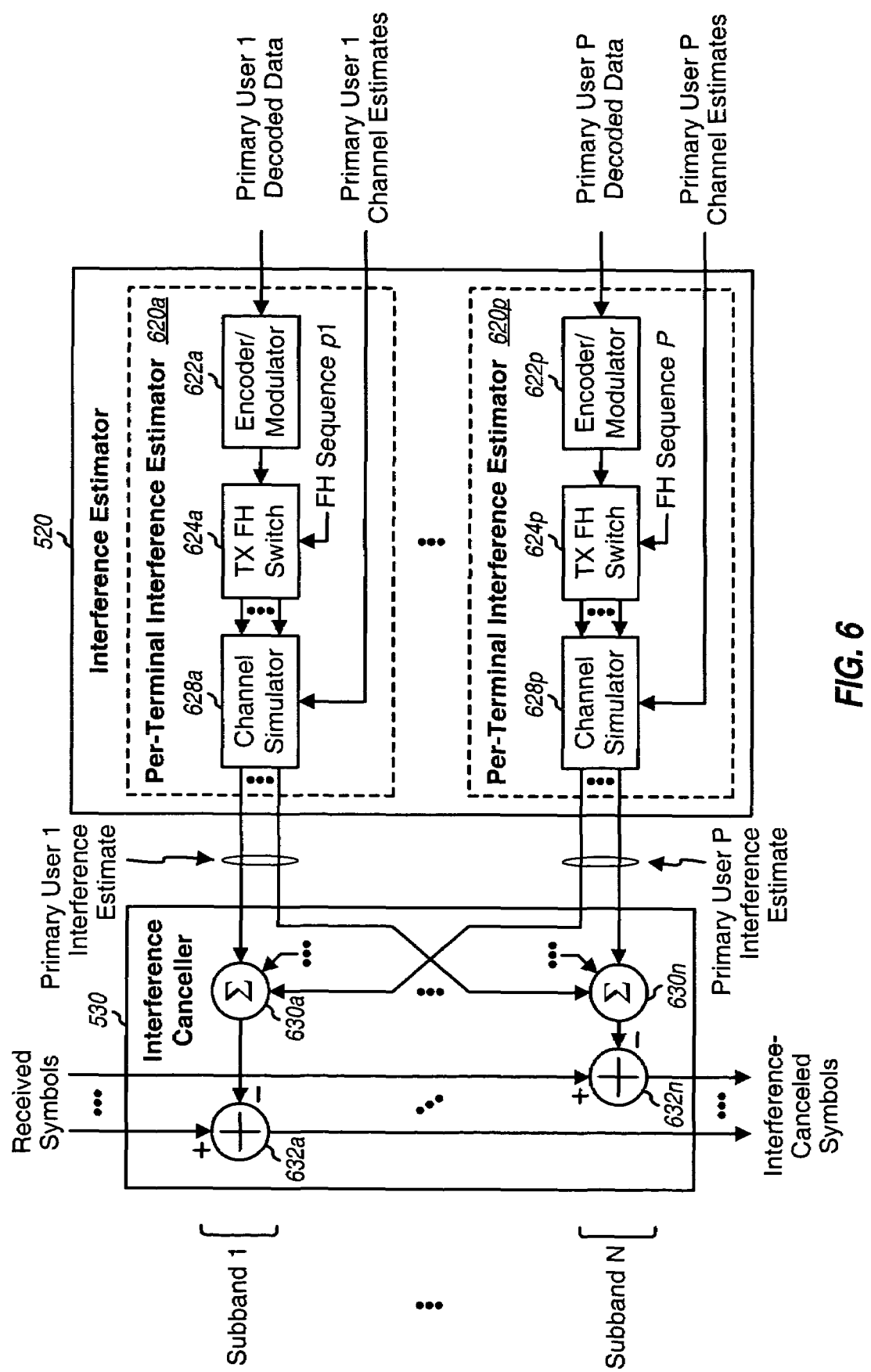
FIG. 6 shows a block diagram of an interference estimator and an interference canceller within the RX data processor.

FIG. 6 shows a block diagram of an embodiment of interference estimator 520 and interference canceller 530 within RX data processor 420 in FIG. 4A for a synchronous OFDMA system. In this embodiment, interference estimator 520 includes P per-terminal interference estimators 620a through 620p for P primary users. One per-terminal interference estimator 620 is assigned to estimate the interference due to each primary user. The processing by per-terminal interference estimator 620a to estimate the interference due to primary user 1 is described below.

Within per-terminal interference estimator 620a, an encoder/modulator 622a receives the decoded traffic data for primary user 1. Encoder/modulator 622a then encodes, interleaves, and modulates the decoded traffic data and provides data symbols. A TX FH switch 624a receives the data symbols from encoder/modulator 622a and provides these symbols onto the proper subbands for traffic channel p1 assigned to primary user 1, as indicated by FH sequence p1 associated with this traffic channel. TX FH switch 624a may also provide pilot symbols on the proper subbands. TX FH switch 624a provides N transmit symbols for the N subbands in each OFDM symbol period. In general, the processing by encoder/modulator 622a and TX FH switch 624a is the same as that performed by encoder/modulator 314 and TX FH switch 316, respectively, at the terminal for primary user 1.

A channel simulator 628a simulates the effects of the communication link between base station 100x and the terminal for primary user 1. Channel simulator 628a receives the transmit symbols from TX FH switch 624a and the channel estimates for primary user 1. Channel simulator 628a then processes the transmit symbols with the channel estimates to obtain an estimate of the interference due to primary user 1. For example, channel simulator 628a may multiply the transmit symbol on each subband with a channel gain estimate for that subband to obtain an interference component on that subband due to primary user 1.

The received symbols contain signal components for the symbols transmitted by the primary users and the secondary users of sector $s_x$. The interference estimate from channel simulator 628a is the signal component for the symbols transmitted by primary user 1. The interference estimate includes N interference components for the N subbands, where the interference component for any given subband may be zero if no data or pilot symbol is transmitted on that subband by primary user 1.

Per-terminal interference estimators 620a through 620p process the decoded traffic data for primary users 1 through P, respectively. Channel simulators 628a through 628p within per-terminal interference estimators 620a through 620p provide the interference estimates for primary users 1 through P, respectively.

Interference canceller 530 includes N P-input summers 630a through 630n and N 2-input summers 632a through 632n, i.e., one set of summers 630 and 632 for each of the N subbands. Interference canceller 530 receives the N received symbols for the N subbands from OFDM demodulator 416 and the interference estimates for primary users 1 through P from per-terminal interference estimators 620a through 620p, respectively. Within interference canceller 530, summer 630a receives and sums the interference components on subband 1 due to the P primary users and provides the total interference on subband 1. Each of the other N-1 summers 630 for subbands 2 through N similarly receives and sums the interference components on the associated subband due to the P primary users and provides the total interference on that subband. Summer 632a receives and subtracts the total interference on subband 1 from the received symbol for subband 1 and provides the interference-canceled symbol for subband 1. Each of the other N-1 summers 632 for subbands 2 through N similarly receives and subtracts the total interference on the associated subband from the received symbol for that subband and provides the interference-canceled symbol for that subband. Summers 632a through 632n provide the N interference-canceled symbols for the N subbands for each OFDM symbol period.

Figure 7:
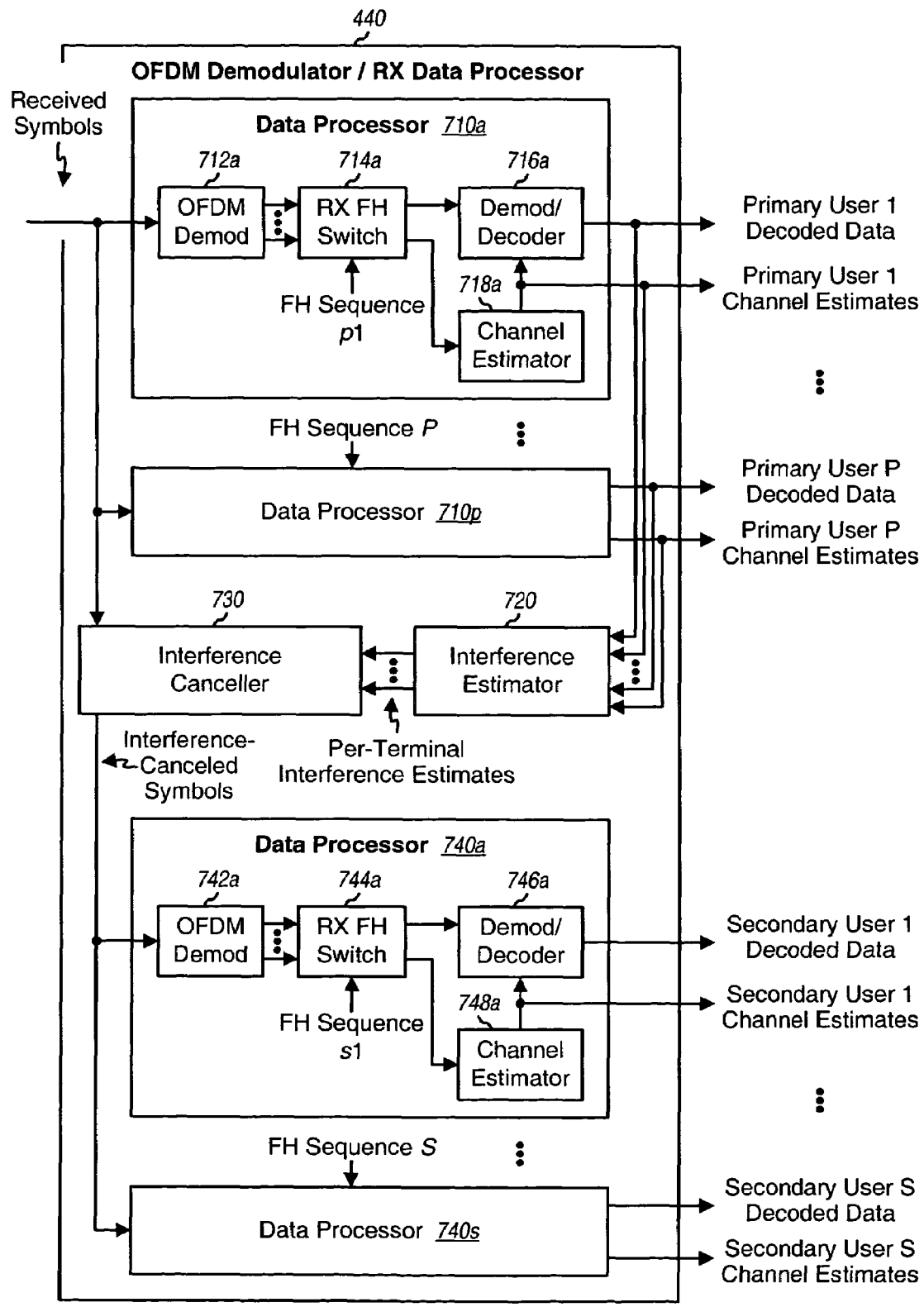
FIG. 7 shows a block diagram of an OFDM demodulator/RX data processor within the base station in the asynchronous system.

FIG. 7 shows a block diagram of an embodiment of OFDM demodulator/RX data processor 440 within base station 110y in FIG. 4B for an asynchronous OFDMA system. In this embodiment, OFDM demodulator/RX data processor 440 includes P data processors 710a through 710p for P primary users, an interference estimator 720, an interference canceller 730, and S data processors 740a through 740s for S secondary users, where $P \geq 1$ and $S \geq 1$.

The recovered symbols from receiver unit 414 are provided to each of data processors 710a through 710p. Each data processor 710 includes an OFDM demodulator 712, an RX FH switch 714, a demodulator/decoder 716, and a channel estimator 718. OFDM demodulator 712 within each data processor 710 performs OFDM demodulation on the received symbols based on the timing of the primary user assigned to that data processor and provides symbol estimates for the N subbands. RX FH switch 714, demodulator/decoder 716, and channel estimator 718 then operate on the symbol estimates in similar manner as described above in FIG. 5 for RX FH switch 514, demodulator/decoder 516, and channel estimator 518, respectively. Each data processor 740 also includes an OFDM demodulator 742 that performs OFDM demodulation on the interference-canceled symbols based on the timing of the secondary user assigned to that data processor.

Figure 8:
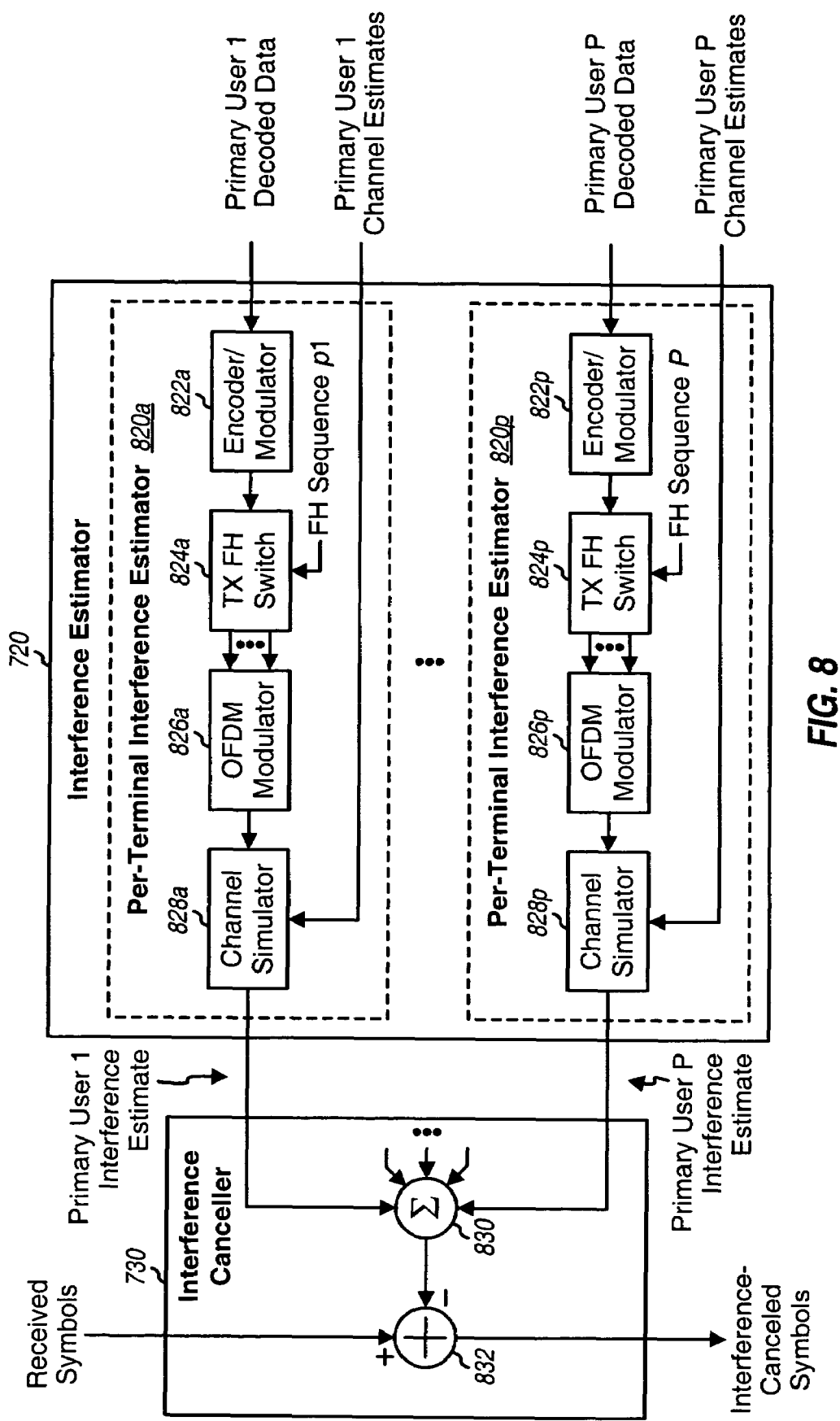
FIG. 8 shows a block diagram of an interference estimator and an interference canceller within the OFDM demodulator/RX data processor.

FIG. 8 shows a block diagram of an embodiment of interference estimator 720 and interference canceller 730 within OFDM demodulator/RX data processor 440 in FIG. 4B for an asynchronous OFDMA system. In this embodiment, interference estimator 720 includes P per-terminal interference estimators 820a through 820p for P primary users. One per-terminal interference estimator 820 is assigned to estimate the interference due to each primary user. Each per-terminal interference estimator 820 includes an encoder/modulator 822, a TX FH switch 824, an OFDM modulator 826, and a channel simulator 828. Encoder/modulator 822 and TX FH switch 824 operate as described above in FIG. 6 for encoder/modulator 622 and TX FH switch 624, respectively. TX FH switch 824 provides N transmit symbols for the N subbands in each OFDM symbol period. OFDM modulator 826 then performs OFDM modulation on the N transmit symbols for each OFDM symbol period and provides time-domain symbols.

Channel simulator 828 then processes the time-domain symbols with the channel estimates for the assigned primary user to obtain an estimate of the interference due to the primary user. Since different primary users may be associated with different timing for an asynchronous system, channel simulator 828 also performs sample rate conversion so that the interference estimate from the channel simulator is time-aligned with the received symbols.

Interference canceller 730 includes a P-input summer 830 and a 2-input summer 832. Interference canceller 730 receives the received symbols from receiver unit 414 and the interference estimates for primary users 1 through P from per-terminal interference estimators 820a through 820p, respectively. Within interference canceller 730, summer 830 sums the interference due to the P primary users and provides the total interference. Summer 832 subtracts the total interference from the received symbols and provides the interference-canceled symbols, which are processed by data processors 740a through 740s for the S secondary users.

The embodiment shown in FIGS. 5 and 6 suggests that the interference due to all P primary users is estimated and canceled prior to recovering the data transmissions from the S secondary users. A primary user of sector $s_x$ may be a soft-handoff user who is power-controlled by multiple sectors in that user's active set. Base station 110x for sector $s_x$ may not be able to decode the data transmission from this primary user if it is power-controlled such that it can be recovered by other sector(s) in the active set. If the data transmission from any primary user cannot be decoded, then base station 110x may not attempt to estimate and cancel the interference due to that primary user. A base station may use partially decoded data to cancel some of the interference.

The description above for FIGS. 5 and 6 also applies to an embodiment whereby a primary user of sector $s_x$ is a non-handoff user of sector $s_x$, and a secondary user of sector $s_x$ is a soft-handoff user of sector $s_x$ (regardless of the serving sector for the soft-handoff user).

For the embodiment shown in FIGS. 5 and 6, the primary users are decoded first and the secondary users are decoded next, after the interference due to the primary users have been estimated and canceled. It may also be possible to decode the secondary users first and then the primary users next, after the interference due to the secondary users have been estimated and canceled. In general, the data transmissions from users may be decoded in any order by base station 110x. The interference due to each successfully decoded user may be estimated and canceled to improve the signal quality of remaining, not yet decoded users. However, system implementation may be simplified if non-handoff users are power-controlled such that they can be successfully decoded in the presence of interference from soft-handoff users. In this case, the non-handoff users are decoded first followed by the soft-handoff users.

For simplicity, FIGS. 5 and 6 show a parallel design whereby (1) one data processor 510 and one per-terminal interference estimator 620 is provided for each primary user and (2) one data processor 540 is provided for each secondary user. A time division multiplex (TDM) design may also be used whereby one data processor 510 is provided and time-shared for all primary and secondary users and one per-terminal interference estimator 620 is also provided and time-shared for all primary users.

Figure 9:
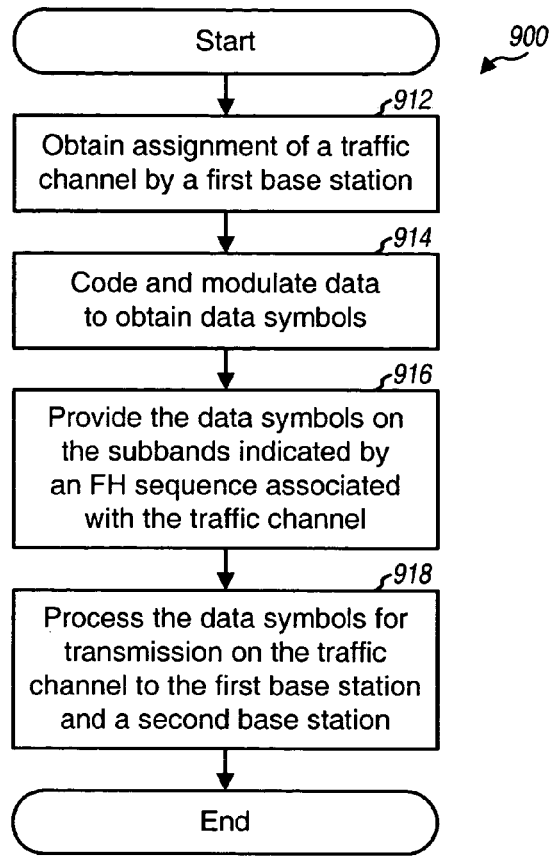
FIG. 9 shows a flow diagram for transmitting data by the terminal.

FIG. 9 shows a flow diagram of a process 900 for transmitting data in a wireless communication system (e.g., a frequency hopping OFDMA system). Process 900 may be performed by each terminal that is in soft handoff with multiple base stations for multiple sectors.

Initially, an assignment of a traffic channel is obtained from a first base station (step 912). For a frequency hopping OFDMA system, the assigned traffic channel is associated with an FH sequence that indicates the specific subband to use for data transmission in each time interval (i.e., each hop period). Data is encoded and modulated to obtain data symbols (step 914). For a frequency hopping OFDMA system, the data symbols are provided on the subbands indicated by the FH sequence (step 916). The data symbols are further processed (e.g., OFDM modulated) for transmission on the assigned traffic channel to the first base station and to a second base station (step 918).

Traffic channels assigned by the first base station are orthogonal to one another and are not orthogonal to traffic channels assigned by the second base station. For a frequency hopping OFDMA system, the traffic channels assigned by the first and second base stations are each associated with a respective FH sequence. The FH sequences for the traffic channels assigned by the first base station are orthogonal to one another and are not orthogonal to the FH sequences for the traffic channels assigned by the second base station.

Figure 10:
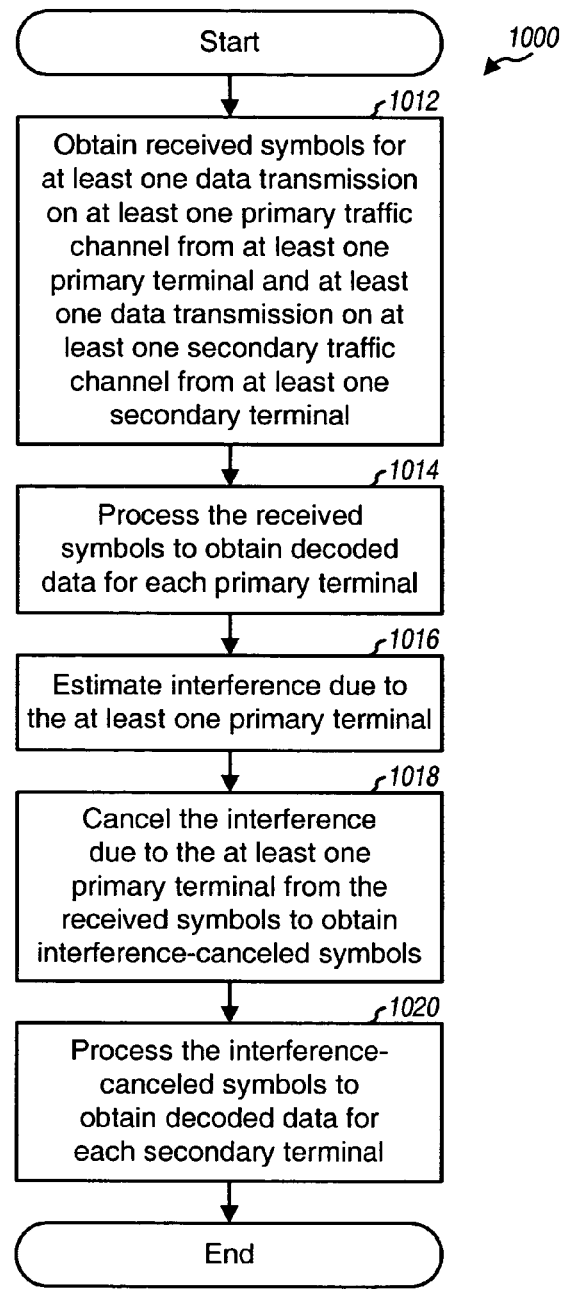
FIG. 10 shows a flow diagram for receiving data transmissions from multiple terminals by the base station.

FIG. 10 shows a flow diagram of a process 1000 for receiving data transmissions from multiple terminals in a wireless communication system (e.g., a frequency hopping OFDMA system). Process 1000 may be performed by the base station for each sector. For clarity, the processing by base station x for sector $s_x$ is described below.

Initially, received symbols are obtained (step 1012). The received symbols include (1) at least one data transmission on at least one "primary" traffic channel from at least one primary terminal and (2) at least one data transmission on at least one "secondary" traffic channel from at least one secondary terminal. Primary traffic channels are those assigned by base station x, and secondary traffic channels are those assigned by other base stations (e.g., neighboring base stations of base station x). The primary traffic channels are orthogonal to one another and are not orthogonal to the secondary traffic channels. The primary traffic channels may be pseudo-random with respect to the secondary traffic channels. Primary terminals are those assigned primary traffic channels by base station x, and secondary terminals are those assigned secondary traffic channels by other base stations. Each secondary terminal may be in soft handoff with at least two base stations (which include base station x) and may be assigned a secondary traffic channel by another base station other than base station x.

For an OFDMA system, the received symbols are obtained for N subbands from an OFDM demodulator. Also for an OFDMA system, each traffic channel is associated with a respective FH sequence. The "primary" FH sequences for the primary traffic channels are orthogonal to one another and are not orthogonal to "secondary" FH sequences for the secondary traffic channels.

The received symbols are processed to obtain decoded data for each primary terminal (step 1014). Interference due to the primary terminal(s) is estimated (step 1016) and canceled from the received symbols to obtain interference-canceled symbols (step 1018). The interference-canceled symbols are then processed to obtain decoded data for each secondary terminal (step 1020).

The processing for each primary terminal may include (1) obtaining the received symbols on the subbands indicated by the primary FH sequence for the primary traffic channel assigned to the primary terminal, (2) deriving channel estimates for the primary terminal (e.g., based on pilot symbols received from the primary terminal), and (3) demodulating and decoding the received symbols for the primary terminal (e.g., with the channel estimates for the primary terminal) to obtain the decoded data for the primary terminal. The processing for each secondary terminal may be performed in similar manner, albeit on the interference-canceled symbols instead of the received symbols.

The interference due to each primary terminal may be estimated by (1) encoding and modulating the decoded data for the primary terminal to obtain data symbols, (2) providing the data symbols on the subbands indicated by the FH sequence assigned to the primary terminal, and (3) processing the data symbols with the channel estimates to obtain the interference due to the primary terminal. The interference due to each primary terminal may be combined to obtain total interference due to the primary terminal(s).

The techniques described herein may be used for a frequency hopping OFDMA system as well as other types of wireless communication systems. For example, these techniques may be used for systems that employ other multi-carrier modulation techniques, such as discrete multi-tone (DMT). These techniques may also be used for wireless communication systems that do not employ multi-carrier modulation and those that do not employ frequency hopping.

The techniques described herein may be used for systems that define traffic channels in some other manners. For a frequency hopping OFDMA system, a traffic channel is defined by an associated FH sequence, which indicates the specific subband to use in each hop period. For a time division multiplex (TDM) system, data may be transmitted in time slots, and multiple traffic channels may be assigned different time slots. The traffic channels for each sector may be defined to be orthogonal to one another so that no two traffic channels use the same time slot. The traffic channels for different sectors may be pseudo-random so that a traffic channel for one sector may use the same time slot as (and thus collide with) a traffic channel for another sector. The techniques described herein may also be used for this TDM system. Each soft-handoff user is assigned one traffic channel by its serving sector. Each sector would recover the data transmissions from the primary users of that sector, cancel the interference due to the primary users, and then recover the data transmissions from the secondary users of that sector.

The techniques described herein may be used to support soft handoff on the reverse link, as described above. These techniques may also be used to support softer handoff, which is a process whereby a terminal communicates with multiple sectors of the same cell. The same processing may be performed at the base station and the terminal for both soft handoff and softer handoff.

The techniques described herein may also be used for the forward link. For example, a terminal may simultaneously receive a user-specific data transmission from one base station and overhead transmissions (e.g., broadcast transmissions) from multiple base stations on the forward link. The terminal may process its received signal to recover the user-specific data transmission from the one base station, estimate and cancel the interference due to the user-specific data transmission, and process the interference-canceled signal to recover the overhead transmissions from the multiple base stations.

The techniques described herein may be implemented by various means. For example, these techniques may be implemented in hardware, software, or a combination thereof. For a hardware implementation, the processing units (e.g., data processors 510 and 540, interference estimator 520, interference canceller 530, and so on) within a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units (e.g., encoder/modulator 314, TX FH switch 316, OFDM modulator 318, and so on) within a terminal may also be implemented within one or more ASICs, DSPs, and so on.

For a software implementation, the techniques described herein may be implemented with modules (e.g., procedures, functions, and so on) that perform the functions described herein. The software codes may be stored in memory units (e.g., memory units 332 and 432 in FIGS. 3 and 4) and executed by processors (e.g., controllers 330 and 430). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data transmissions in a wireless communication system, comprising:

obtaining received symbols for at least one data transmission on at least one primary traffic channel from at least one primary terminal and at least one data transmission on at least one secondary traffic channel from at least one secondary terminal, wherein the at least one primary traffic channel is orthogonal to at least one other primary traffic channel and is not orthogonal to the at least one secondary traffic channel;

processing the received symbols to obtain decoded data for each of the at least one primary terminal;

estimating interference due to the at least one primary terminal;

canceling the interference due to the at least one primary terminal from the received symbols to obtain interference-canceled symbols; and processing the interference-canceled symbols to obtain decoded data for each of the at least one secondary terminal.

2. The method of claim 1, wherein the wireless communication system is a frequency hopping communication system.

3. The method of claim 2, wherein the at least one primary traffic channel and the at least one secondary traffic channel are each associated with a respective frequency hopping (FH) sequence that indicates a specific one of a plurality of subbands to use for data transmission in each time interval.

4. The method of claim 1, wherein the wireless communication system is a synchronous system.

5. The method of claim 1, wherein the wireless communication system is an asynchronous system.

6. A method of receiving data transmissions at a base station in a wireless frequency hopping (FH) communication system, comprising:

obtaining received symbols for a plurality of subbands;

processing the received symbols to obtain decoded data for each of at least one primary terminal, wherein the at least one primary terminal is assigned at least one primary FH sequence to use for data transmission, and wherein the at least one primary FH sequence is orthogonal to at least one other primary FH sequence;

estimating interference due to the at least one primary terminal;

canceling the interference due to the at least one primary terminal from the received symbols to obtain interference-canceled symbols; and processing the interference-canceled symbols to obtain decoded data for each of at least one secondary terminal, wherein the at least one secondary terminal is assigned at least one secondary FH sequence to use for data transmission, and wherein the at least one secondary FH sequence is not orthogonal to the at least one primary FH sequence.

7. The method of claim 6, wherein the at least one primary terminal is assigned the at least one primary FH sequence by the base station, and wherein the at least one secondary terminal is assigned the at least one secondary FH sequence by neighboring base stations of the base station.

8. The method of claim 6, wherein each of the at least one secondary terminal is in soft handoff with at least two base stations that include the base station.

9. The method of claim 8, wherein a first secondary terminal among the at least one secondary terminal is in soft handoff with at least two base stations for at least two different sectors of one cell in the system.

10. The method of claim 8, wherein a first secondary terminal among the at least one secondary terminal is in soft handoff with at least two base stations for at least two different cells in the system.

11. The method of claim 8, wherein each of the at least one secondary terminal is assigned a secondary FH sequence by one of the at least two base stations other than the base station.

12. The method of claim 6, wherein the at least one primary terminal include terminals not in soft handoff and communicating with only the base station.

13. The method of claim 12, wherein the at least one primary terminal further include terminals in soft handoff and assigned FH sequences by the base station.

14. The method of claim 6, wherein the at least one primary FH sequence is pseudo-random with respect to the at least one secondary FH sequence.

15. The method of claim 6, wherein the processing the received symbols includes for each of the at least one primary terminal, obtaining received symbols on subbands indicated by a primary FH sequence assigned to the primary terminal, deriving channel estimates for the primary terminal, and demodulating and decoding the received symbols for the primary terminal to obtain the decoded data for the primary terminal.

16. The method of claim 6, wherein the estimating includes for each of the at least one primary terminal, encoding and modulating the decoded data for the primary terminal to obtain data symbols for the primary terminal, providing the data symbols for the primary terminal on subbands indicated by a primary FH sequence assigned to the primary terminal, and processing the data symbols for the primary terminal with channel estimates for the primary terminal to obtain interference due to the primary terminal, and combining the interference due to each of the at least one primary terminal to obtain the interference due to the at least one primary terminal.

17. The method of claim 6, wherein the processing the interference-canceled symbols includes for each of the at least one secondary terminal, obtaining interference-canceled symbols on subbands indicated by a secondary FH sequence assigned to the secondary terminal, and demodulating and decoding the interference-canceled symbols for the secondary terminal to obtain the decoded data for the secondary terminal.

18. The method of claim 6, wherein the wireless communication system is an orthogonal frequency division multiple access (OFDMA) communication system.

19. An apparatus in a wireless frequency hopping (FH) communication system, comprising:

means for obtaining received symbols for a plurality of subbands;

means for processing the received symbols to obtain decoded data for each of at least one primary terminal, wherein the at least one primary terminal is assigned at least one primary FH sequence to use for data transmission, and wherein the at least one primary FH sequence is orthogonal to at least one other primary FH sequence;

means for estimating interference due to the at least one primary terminal;

means for canceling the interference due to the at least one primary terminal from the received symbols to obtain interference-canceled symbols; and means for processing the interference-canceled symbols to obtain decoded data for each of at least one secondary terminal, wherein the at least one secondary terminal is assigned at least one secondary FH sequence to use for data transmission, and wherein the at least one secondary FH sequence is not orthogonal to the at least one primary FH sequence.

20. An apparatus in a wireless frequency hopping (FH) communication system, comprising:

at least one first data processor operative to process received symbols to obtain decoded data for each of at least one primary terminal, wherein the at least one primary terminal is assigned at least one primary FH sequence to use for data transmission, and wherein the at least one primary FH sequence is orthogonal to at least one other primary FH sequence;

an interference estimator operative to estimate interference due to the at least one primary terminal;

an interference canceller operative to cancel the interference due to the at least one primary terminal from the received symbols to obtain interference-canceled symbols; and at least one second data processor operative to process the interference-canceled symbols to obtain decoded data for each of at least one secondary terminal, wherein the at least one secondary terminal is assigned at least one secondary FH sequence to use for data transmission, and wherein the at least one secondary FH sequence is not orthogonal to the at least one primary FH sequence.

21. The apparatus of claim 20, wherein each of the at least one first data processor is assigned to a respective one of the at least one primary terminal, and wherein the first data processor for each primary terminal includes a switch operative to obtain received symbols on subbands indicated by a primary FH sequence assigned to the primary terminal, a channel estimator operative to derive channel estimates for the primary terminal, and a demodulator and decoder operative to demodulate and decode the received symbols for the primary terminal to obtain the decoded data for the primary terminal.

22. The apparatus of claim 20, wherein the interference estimator includes at least one per-terminal interference estimator each operative to estimate interference due to a respective one of the at least one primary terminal, and wherein the per-terminal interference estimator for each primary terminal includes an encoder and modulator operative to encode and modulate the decoded data for the primary terminal to obtain data symbols for the primary terminal, a switch operative to provide the data symbols for the primary terminal on subbands indicated by a primary FH sequence assigned to the primary terminal, and a channel simulator operative to process the data symbols for the primary terminal with channel estimates for the primary terminal to obtain the interference due to the primary terminal.

23. A processor readable media for storing instructions operable to:

obtain received symbols for a plurality of subbands;

process the received symbols to obtain decoded data for each of at least one primary terminal, wherein the at least one primary terminal is assigned at least one primary frequency hopping (FH) sequence to use for data transmission, and wherein the at least one primary FH sequence is orthogonal to at least one other primary FH sequence;

estimate interference due to the at least one primary terminal;

cancel the interference due to the at least one primary terminal from the received symbols to obtain interference-canceled symbols; and process the interference-canceled symbols to obtain decoded data for each of at least one secondary terminal, wherein the at least one secondary terminal is assigned at least one secondary FH sequence to use for data transmission, and wherein the at least one secondary FH sequence is not orthogonal to the at least one primary FH sequence.

* * * * *